United States Patent
Yuan et al.

(10) Patent No.: US 9,293,132 B2
(45) Date of Patent: Mar. 22, 2016

(54) DYNAMIC GEO-FENCING FOR VOICE RECOGNITION DICTIONARY

(71) Applicant: Honda Motor Co., Ltd., Tokyo (JP)

(72) Inventors: Alvin Yuan, Raymond, OH (US); Stuart Yamamoto, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/452,795

(22) Filed: Aug. 6, 2014

(65) Prior Publication Data

US 2016/0042733 A1 Feb. 11, 2016

(51) Int. Cl.
| | |
|---|---|
| *G10L 15/00* | (2013.01) |
| *G10L 15/06* | (2013.01) |
| *H04W 4/02* | (2009.01) |
| *G10L 15/08* | (2006.01) |

(52) U.S. Cl.
CPC ............... *G10L 15/063* (2013.01); *G10L 15/08* (2013.01); *H04W 4/021* (2013.01); *H04W 4/027* (2013.01)

(58) Field of Classification Search
CPC ....... G06Q 10/00; G06Q 40/00; G06Q 40/06; H04W 4/02; H04W 4/028; H04W 8/16; H04W 8/205
USPC .............. 704/243, 3, 2, 275, 9; 701/427, 443, 701/488; 455/456.3
See application file for complete search history.

(56) References Cited

U.S. PATENT DOCUMENTS

| | | | |
|---|---|---|---|
| 5,864,753 A | 1/1999 | Morita et al. | |
| 6,112,174 A | 8/2000 | Wakisaka et al. | |
| 6,598,018 B1 | 7/2003 | Junqua | |
| 7,184,957 B2 | 2/2007 | Brookes et al. | |
| 7,277,846 B2 * | 10/2007 | Satoh | ................................ 704/3 |
| 7,328,155 B2 | 2/2008 | Endo et al. | |
| 7,831,431 B2 | 11/2010 | Huang et al. | |
| 8,112,276 B2 | 2/2012 | Sumiyoshi et al. | |
| 8,219,399 B2 | 7/2012 | Lutz et al. | |
| 8,442,815 B2 | 5/2013 | Okada et al. | |
| 8,510,032 B2 | 8/2013 | Shen et al. | |
| 8,645,143 B2 | 2/2014 | Mozer | |
| 8,700,392 B1 | 4/2014 | Hart et al. | |
| 2002/0111810 A1 | 8/2002 | Khan et al. | |
| 2005/0102148 A1 | 5/2005 | Rogitz | |
| 2006/0074660 A1 | 4/2006 | Waters et al. | |
| 2007/0124057 A1 | 5/2007 | Prieto et al. | |
| 2009/0055178 A1 | 2/2009 | Coon | |
| 2014/0287779 A1 * | 9/2014 | O'Keefe et al. | ............ 455/456.3 |

FOREIGN PATENT DOCUMENTS

| | | |
|---|---|---|
| JP | 08320697 | 12/1996 |
| JP | 2000074685 A | 3/2000 |

* cited by examiner

*Primary Examiner* — Charlotte M Baker
(74) *Attorney, Agent, or Firm* — Arent Fox LLP

(57) ABSTRACT

There is a provided a mobile electronic device and a computer-implemented method. The method includes: receiving, by an electronic device, location parameters comprising a location of the electronic device, a direction of travel of the electronic device and a speed of the electronic device; configuring, by the electronic device, a dynamic geo-fenced area based on the location parameters, wherein the dynamic geo-fenced area surrounds the location of the electronic device; retrieving, by the electronic device, a Voice Recognition (VR) dictionary subset comprising data associated with the dynamic geo-fenced area from a VR dictionary, wherein the data comprises a broadcast station name and a broadcast frequency associated with the broadcast station name; and performing voice recognition using the VR dictionary subset.

20 Claims, 4 Drawing Sheets

DYNAMIC GEO-FENCING FOR VOICE RECOGNITION DICTIONARY

BACKGROUND

Automobiles equipped with speech-recognition and text-to-speech capabilities simplify tasks that would otherwise take away a driver's attention from driving. Current Voice Recognition (VR) systems allow a driver to tune to a broadcast station by using a VR command to tune to a broadcast frequency by speaking the broadcast frequency. As the VR system does not recognize broadcast station names, the current VR system is not very user friendly. Currently there are a lot of broadcast stations and Points-of-Interests (POIs) with common or similar names throughout the country. For example, the number of AM and FM stations in the United States is presently greater than 15,000 and the number is still growing. When searching for a broadcast station name or POI with a large dictionary two problems arise: high misrecognition rates due to large dictionary, and disambiguating a large number of matches to similar sounding broadcast stations and POIs, in particular, when determining a user's intent. As the number of stations grows, the problems of misrecognition and disambiguation get worse.

SUMMARY

The present disclosure relates to performing voice or speech recognition using a voice dictionary subset based on location parameters, in particular, by identifying a broadcast type, a broadcast frequency and other broadcast information that is mapped to or associated with a voiced or spoken broadcast station name. Broadcast stations names include, for example, colloquial names, advertised broadcast station names, broadcast call letters, broadcast station genres, broadcast station's affiliation with a national network or show, or the like.

It is to be understood that both the foregoing general description and the following detailed description are exemplary and explanatory and are intended to provide further explanation of the disclosure as claimed.

According to exemplary embodiments, there is provided a computer-implemented method including: receiving, by an electronic device, location parameters comprising a location of the electronic device, a direction of travel of the electronic device and a speed of the electronic device; configuring, by the electronic device, a dynamic geo-fenced area based on the location parameters, wherein the dynamic geo-fenced area surrounds the location of the electronic device; retrieving, by the electronic device, a Voice Recognition (VR) dictionary subset comprising data associated with the dynamic geo-fenced area from a VR dictionary, wherein the data comprises a broadcast station name and a broadcast frequency associated with the broadcast station name; and performing voice recognition using the VR dictionary subset.

According to exemplary embodiments, there is provided a mobile electronic device including: a broadcast tuner configured to receive tuning commands; and a voice recognizer for communicating spoken commands to the broadcast tuner, wherein the voice recognizer is configured to receive location parameters comprising a location of the electronic device, a direction of travel of the electronic device and a speed of the electronic device, configure a dynamic geo-fenced area based on the location parameters, wherein the dynamic geo-fenced area surrounds the location, retrieve a Voice Recognition (VR) dictionary subset comprising data associated with the dynamic geo-fenced area from a VR dictionary, wherein the data comprises a broadcast station name and a frequency associated with the broadcast station name, and perform voice recognition using the VR dictionary subset.

Additional features will be set forth in the description that follows, and in part will be apparent from the description, or may be learned by practice of what is described.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the principles of the disclosure. A data-flow diagram is an abstract representation of information flowing in and out of the system and from place to place within the system, and where it may be operated upon by different elements of the system. Different elements may be operated on by modules or processes within the system, and data from these modules may flow to another module.

DESCRIPTION

Figure 1:
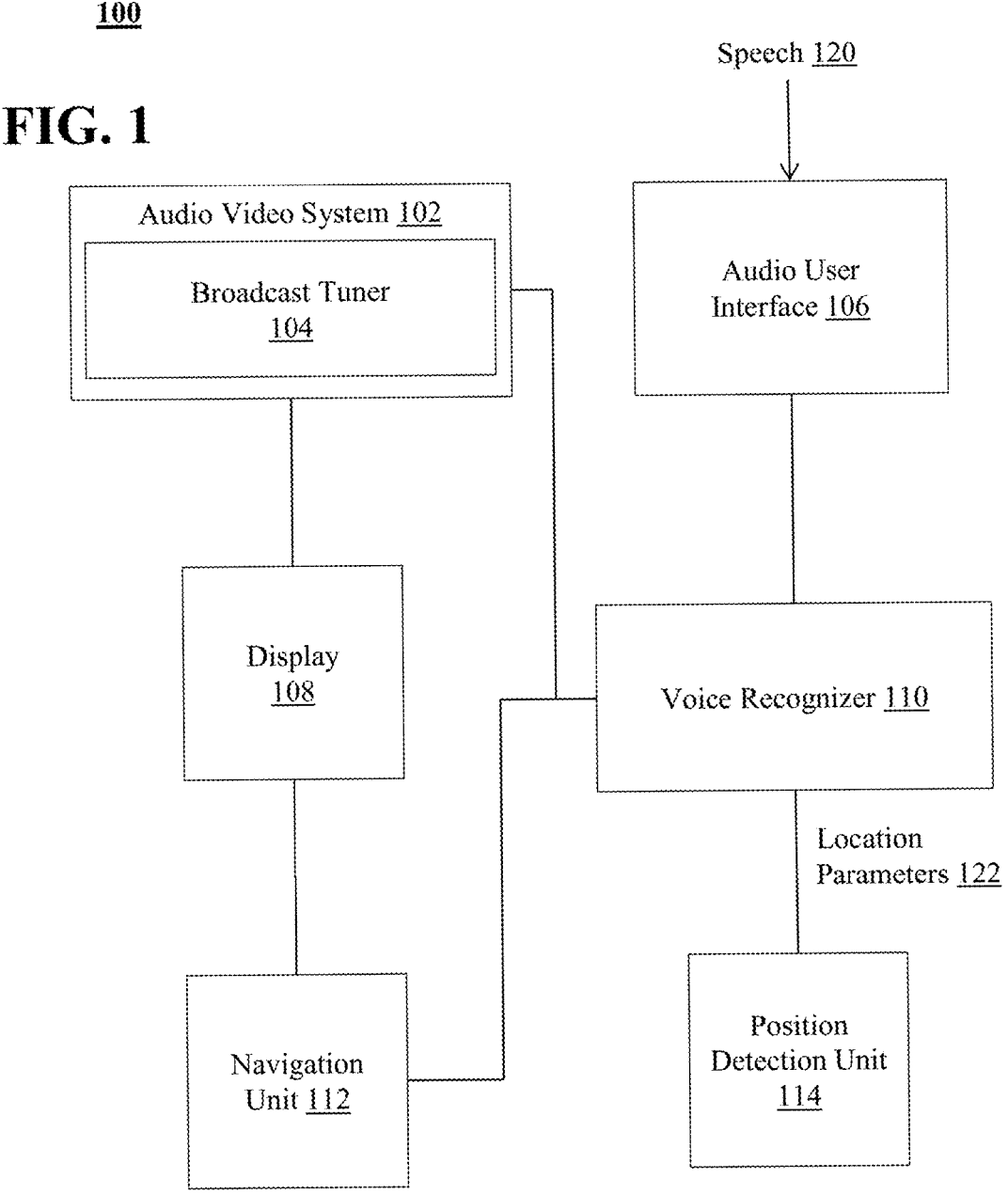
FIG. 1 illustrates a mobile electronic device in accordance with one embodiment of the present application.

The disclosure is described more fully hereinafter with reference to the accompanying drawings, in which exemplary embodiments of the disclosure are shown. This disclosure may, however, be embodied in many different forms and should not be construed as limited to the embodiments set forth herein. Rather, these exemplary embodiments are provided so that this disclosure is thorough, and will fully convey the scope of the disclosure to those skilled in the art. It will be understood that for the purposes of this disclosure, "at least one of X, Y, and Z" may be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Some portions of the detailed description that follows are presented in terms of algorithms and symbolic representations of operations on data bits within a computer memory. These algorithmic descriptions and representations are used by those skilled in the data processing arts to convey the substance of their work to others skilled in the art. Here, and generally, an algorithm is conceived to be a self-consistent sequence of operations (instructions) leading to a desired result. The operations are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of operations requiring physical manipulations of physical quantities as modules or code devices, without loss of generality. The process operations, steps and instructions of the embodiments may be embodied in software, firmware or hardware, and when embodied in software, may be downloaded to reside on and be operated from different platforms used by a variety of operating systems.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or a similar electronic computing device, that manipulates and transforms data represented as physical (electronic) quantities within the computer system memories or registers or other such information storage, transmission or display devices.

The embodiments also relate to an apparatus for performing the operations herein. This apparatus may be specially constructed for the required purposes, or it may be a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs.

The present disclosure relates to performing voice or speech recognition using a voice dictionary subset retrieved from a voice dictionary, where the retrieval is based on geo-fencing the voice dictionary by a mobile device's location. The voice dictionary subset identifies a broadcast type, a broadcast frequency and other broadcast information that is mapped to or associated with a voiced or spoken broadcast station name. A broadcast station name may include, for example, a colloquial name, an advertised broadcast station name, broadcast call letters, a broadcast station genre, a broadcast station's network or show affiliation, or the like. The broadcast type can specify, for example, an AM radio broadcast, an FM radio broadcast, a satellite radio broadcast, a terrestrial television broadcast, a satellite television broadcast or the like.

In a mobile electronic device, location parameters can be utilized to dynamically geo-fence a voice recognition (VR) dictionary in order to retrieve, adjust or arrange a subset voice recognition dictionary that narrows down the search space of broadcast station names and points of interests. By localizing the VR dictionary in a VR dictionary subset with a dynamic geo-fence, local names of broadcast stations and points of interests receive more attention in voice recognition or may otherwise be more likely to be selected as a candidate interpretation of the name as spoken. The location parameters can be received or derived from, among other sources, the current system display (e.g., the segment of the map currently displayed); a predetermined or variable area surrounding the vehicle's current location, as determined by a position detection unit (e.g., a GPS receiver); speech; and/or user gestures (e.g., a circle drawn by touch by the user on the touch screen).

The geo-fence can be received or derived from a predetermined area of fixed size based on location parameters of the electronic device. In exemplary embodiments, the size of the geo-fenced area, from which geographic information may be received or derived, may vary, for example, with the density of POIs and/or nearby broadcast station names in the area (i.e., with the number of POIs). For example, a number of POIs or broadcast station names surrounding, and closest to, the mobile electronic device may be provided by using a geo-fenced area based on the location parameters.

A VR system providing input to other peripherals or systems in a vehicle may quickly respond to a user. For example, when interpreting and executing a VR command that commands a broadcast tuner to tune to a broadcast station by name, the VR system may recognize the spoken VR command in less than ten (10) seconds, less than 5 seconds, less than 2 seconds, less than 1 second or the like, in order to provide a user friendly experience to the user.

FIG. 1 illustrates a mobile electronic device according to exemplary embodiments. FIG. 1 illustrates a mobile electronic device 100 including an audio video system 102 including a broadcast tuner 104, an audio user interface 106, a display 108, a voice recognizer 110, a navigation unit 112 and a position detection unit 114.

The voice recognizer 110 may receive speech input in the form of acoustic signals, e.g., speech, at the audio user interface 106. The speech may be voiced by one or more users (human speakers) in the form of user utterances. In exemplary embodiments, the voice recognizer 110 may utilize location parameters 122 from the position detection unit 114. The navigation unit 112 may provide a list of POIs, streets, or other proper names that are currently within a dynamic geo-fenced area located about the mobile electronic device 100.

The mobile electronic device 100 may be installed in a vehicle, and thus location parameters 122 may change as the vehicle travels.

The display 108 may include a touch screen (e.g., a screen that is sensitive to the electrical conductivity, heat, pressure, and/or optical light-blocking qualities of touch) and may provide location parameters related to gestures marked by a user on a map on the display 108. Possible gestures may include a circle, a line or a point.

The audible user interface 106 may receive audible spoken inputs from a user. The voice recognizer 110 may convert the spoken inputs into strings of alphanumeric characters. The alphanumeric characters may be provided in binary form or any other form that is suitable for processing. The alphanumeric characters may be indicative of the pronunciation of the spoken inputs as provided by the user. The strings of characters may be used by voice recognizer 110 to create a list of preliminary candidate interpretations. The preliminary candidate interpretations on the list may be provided in an order based on decreasing similarity of pronunciation with the character string. The preliminary candidate interpretations on the list may order the listing matches from a VR dictionary subset 222 (see FIG. 2) followed by matches from a VR dictionary 220 (see FIG. 2). The preliminary candidate interpretations on the list may provide a greater weight to matches from a VR dictionary subset 222 (see FIG. 2) as compared to the weight provided for matches the VR dictionary 220. In exemplary embodiments, the VR dictionary subset 222 may be included in, retrieved from, or extracted from the VR dictionary 220.

The audio video system 102 may include a broadcast tuner 104. The broadcast tuner 104 may be disposed in a mobile unit, such as, a vehicle, that is equipped with a broadcast receiver for receiving radio and/or television broadcasting. To identify a desired broadcasting station to a broadcast receiver, a user may tune to the broadcast frequency by manipulating an operation device, such as, a tuning button, a voice recognition button, a keyword spoken prior to speaking a tuning command, or speaking the station name in a defined manner (for example, emphatically). When a voice recognition operation device is actuated, the audio video system 102 requests that the audio user interface 106 capture the speech including a spoken broadcast station name.

Figure 2:
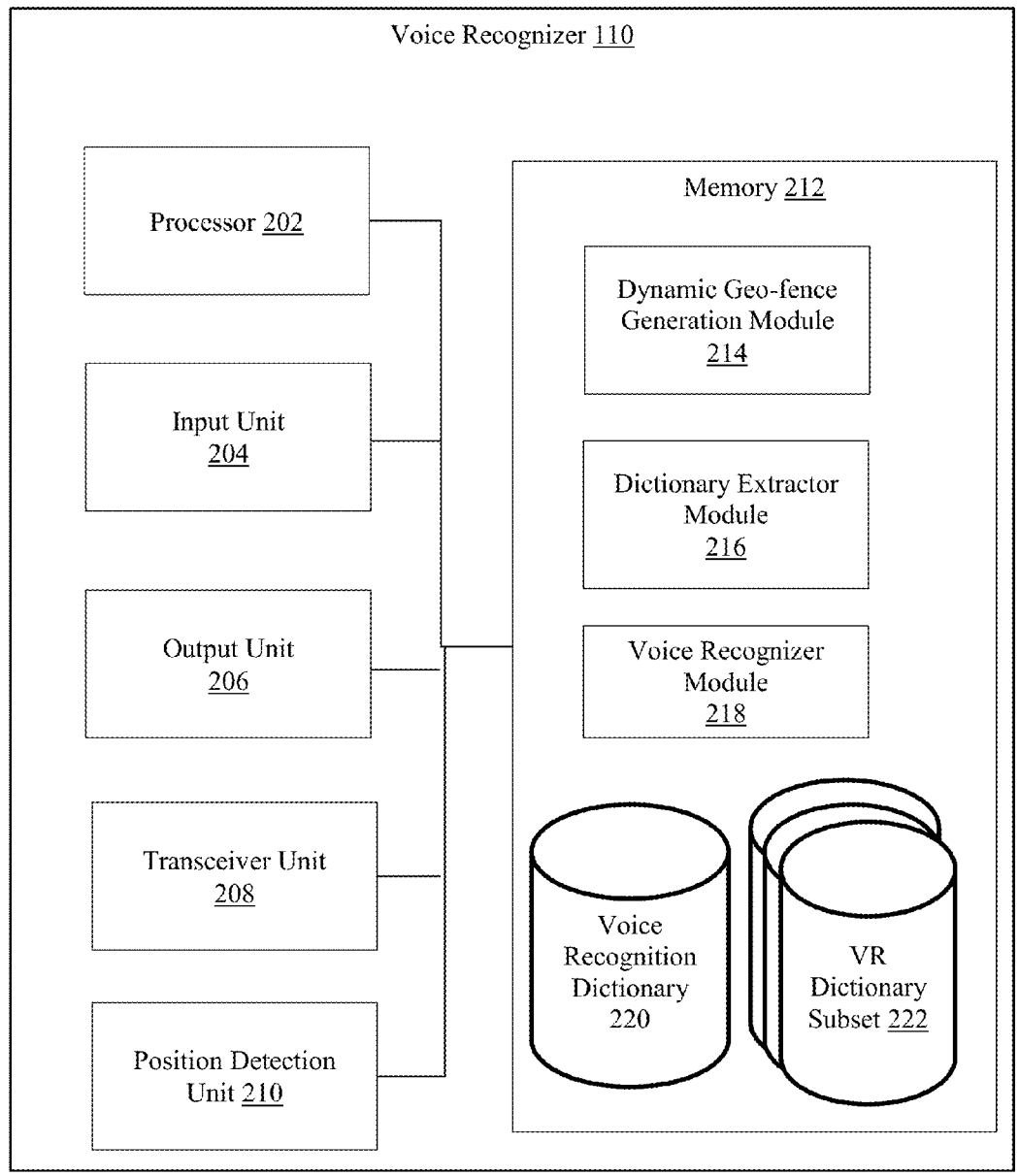
FIG. 2 illustrates a voice recognizer module in accordance with one embodiment of the present application.

FIG. 2 illustrates a voice recognizer according to exemplary embodiments. A voice recognizer 110 may include a processor 202, an input unit 204, an output unit 206, a transceiver unit 208, a position detection unit 210, and a memory 212.

The processor 202 processes data signals and includes various computing architectures including a complex instruction set computer (CISC) architecture, a reduced instruction set computer (RISC) architecture, or an architecture implementing a combination of instruction sets. Although only a single processor is illustrated in FIG. 2, multiple processors may be included. The processor 202 includes an arithmetic logic unit, a microprocessor, a general purpose computer, or some other information appliance equipped to transmit, receive and process electronic data signals from the memory 212, the input unit 204, the output unit 206, the transceiver unit 208, or the position detection unit 210.

The input unit 204 is configured and arranged to provide user input to the voice recognizer 110. An exemplary input unit 204 may include a cursor controller, a keyboard, a touch-screen device, a microphone, a haptic feedback device, or the like. In exemplary embodiments, the input unit 204 may include an alphanumeric input device, such as, a QWERTY keyboard, a key pad or representations of such created on a touch screen, configured and arranged to communicate information and/or command selections to processor 202 or memory 212. In exemplary embodiments, the input unit 204 may include a user input device to communicate location parameters, positional data and/or command selections to processor 202. The input unit 204 may include a joystick, a mouse, a trackball, a stylus, a pen, a touch screen, cursor direction keys or the like to cause movement adjustment of an image.

The output unit 206 includes a device configured and arranged to display electronic images and data as described herein. Output unit 206 may include, for example, a light emitting diode (LED) display, an organic light emitting diode (OLED) display, liquid crystal display (LCD), cathode ray tube (CRT) display, or the like. In exemplary embodiments, output unit 206 may include a touch-sensitive touch screen including a transparent panel cover disposed over or integrated with the screen of output unit 206. In exemplary embodiments, the output unit 206 includes a speaker that outputs audio as described herein.

The transceiver unit 208 includes a device configured and arranged to communicate with entities connected to a network, for example, a wireless communication network 116. In exemplary embodiments, the voice recognizer 110 uses the transceiver unit 208 to communicate with remote systems or devices, such as, a server (not shown) capable of updating the VR dictionary. The transceiver unit 208 may communicate with a wireless communication network that is proprietary and accessible only to an Original Equipment Manufacturer (OEM). In some embodiments, the wireless communication network may share a physical medium with other networks also utilizing the physical medium. In exemplary embodiments, the wireless communication network may include a satellite-based communication network. In exemplary embodiments, the wireless communication network may include a cellular network.

The position detection unit 210 includes a device configured and arranged to communicate with a positioning satellite (e.g., a global positioning system (GPS) satellite) to determine a geographical location of the electronic device 100. In exemplary embodiments, the position detection unit 210 searches for and collects GPS information or signals from three, four or more GPS satellites to determine the location of the electronic device 100. Using the time interval between the broadcast time and reception time of each signal, the position detection unit 210 may calculate the distance between the electronic device 100 and each of the GPS satellites. These distance measurements, along with the position and time information received in the signals, allow the position detection unit 210 to calculate or determine the geographical location and/or attitude of the electronic device 100. The geographical location and/or attitude of the electronic device 100 may be provided to the voice recognizer 110. The attitude of the electronic device 100 may include an angular velocity (speed and direction of travel). The attitude of the electronic device 100 may include a rotational velocity of the electronic device 100.

The memory 212 stores instructions and/or data that may be executed by processor 202. The instructions and/or data may code for performing any and/or all of the techniques described herein. Memory 212 may be a Dynamic Random Access Memory (DRAM) device, a Static Random Access Memory (SRAM) device, Flash RAM (non-volatile storage), combinations of the above, or the like. The memory 212 may store a dynamic geo-fence generation module 214, a dictionary extractor module 216, a voice recognizer module 218, a voice recognition dictionary 220 and a voice recognition dictionary subset 222. The modules may communicate with the processor 202, the input unit 204, the output unit 206, the transceiver unit 208 and the position detection unit 210.

Figures 3A, 3B:
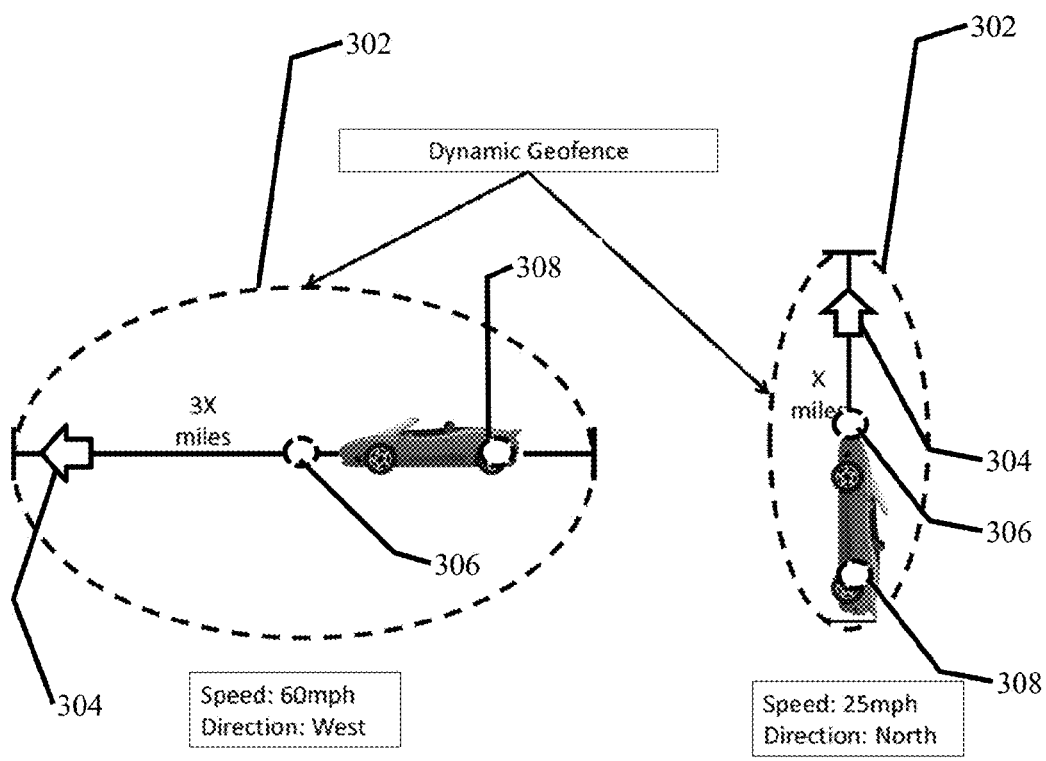
FIG. 3A illustrates a dynamic geo-fence in accordance with one embodiment of the present application.
FIG. 3B illustrates a dynamic geo-fence in accordance with one embodiment of the present application.

The dynamic geo-fence generation module 214 generates a dynamic geo-fence area 302 (see, FIG. 3A and FIG. 3B) for which to extract a voice recognition (VR) dictionary for. The dynamic geo-fence generation module 214 bases the dynamically generated geo-fence 302 on the location parameters 122. Location parameters 122 may include a location 308, a speed and a direction of travel 304 for the mobile electronic device 100. In some embodiments, the generated geo-fence 302 may be a virtual fence surrounding the location 308 of the mobile electronic device 100. In exemplary embodiments, the generated geo-fence may be centered at the location 308 of the mobile electronic device 100. In exemplary embodiments, the generated geo-fence may be centered at a position that differs from the location 308 of the mobile electronic device 100, for example, the generated geo-fence may be centered on a position 306 disposed along a direction of travel 304 of the mobile electronic device 100. In exemplary embodiments, an area of the generated geo-fence 302 may be adjusted or set proportional to the speed of travel of the mobile electronic device 100, for example, the area of the generated geo-fence 302 can encompass a greater area (3× miles around the position 306) when traveling at 60 miles per hour (see, FIG. 3A) as compared to the area (X miles around the position 306) of the generated geo-fence when traveling at 25 miles per hour (see, FIG. 3B). Here, the distance X may be preset by a manufacturer of the mobile electronic device 100, for example, 20 miles, 30 miles or the like.

The dictionary extractor module 216 retrieves geo-fence data associated with the dynamically generated geo-fence area defined by the dynamic geo-fence generator module 216. The dictionary extractor module 216 retrieves the dictionary data associated with the dynamically generated geo-fence area to form the VR dictionary subset 222. In exemplary embodiments, the dictionary extractor module 216 extracts the VR dictionary subset 222 into a database, a view in a database, a table or view of a database storing the VR dictionary 220, a separate file or the like. In exemplary embodiments, the VR dictionary subset 222 may include multiple VR dictionary subsets, where each subset includes dictionary data for a different geo-fenced area.

In exemplary embodiments, the dictionary extractor module 216 adjusts the VR dictionary subset 222 by adding to the dictionary data associated with the dynamically generated geo-fence area as necessary, for example, when a speed of travel of the mobile electronic device 100 increases from being below a threshold speed (e.g., 55 mph) to being greater than the threshold speed, when the mobile electronic device 100 travels a threshold distance from where the current geo-fence was determined, or the like. In exemplary embodiments, the dictionary extractor module 216 adjusts the VR dictionary subset 222 by removing the dictionary data not associated with the dynamically generated geo-fence area as necessary, for example, when a speed of travel of the mobile electronic device 100 decreases from being above a threshold speed (e.g., 55 mph) to being less than the threshold speed, when the mobile electronic device 100 travels a threshold distance from where the current geo-fence was determined, or the like.

The voice recognizer module 218 communicates with users of the voice recognizer 110. The voice recognizer module 218 receives from a user (e.g., a user of the electronic device 100) a spoken command. In exemplary embodiments, the spoken command may request tuning the radio to a broadcast station by name. In exemplary embodiments, the spoken command may request the navigation system to display a position of a point of interest, directions to the point of interest, and the like. The voice recognizer 218 performs voice recognition on the spoken command (speech) to determine the spoken command. The voice recognizer 218 may also perform voice recognition on any parameters included or accompanying the spoken command using the VR Dictionary subset 222 provided by the dictionary extractor module 216. In exemplary embodiments, the voice recognizer 218 also performs voice recognition on any parameters included or accompanying the spoken command using the VR Dictionary 220, for example, when voice recognition using the VR dictionary subset 222 fails. In exemplary embodiments, the voice recognizer module 218 communicates with a user via the input unit 204 and output unit 206. In exemplary embodiments, the input unit 204 may include the audio user interface 106.

In exemplary embodiments, the output unit 204 may be used to display messages from the voice recognizer 110 to a user. The output unit 204 displays information regarding the recognized command. In exemplary embodiments, the output unit 204 displays information regarding the recognized station name.

Figure 4:
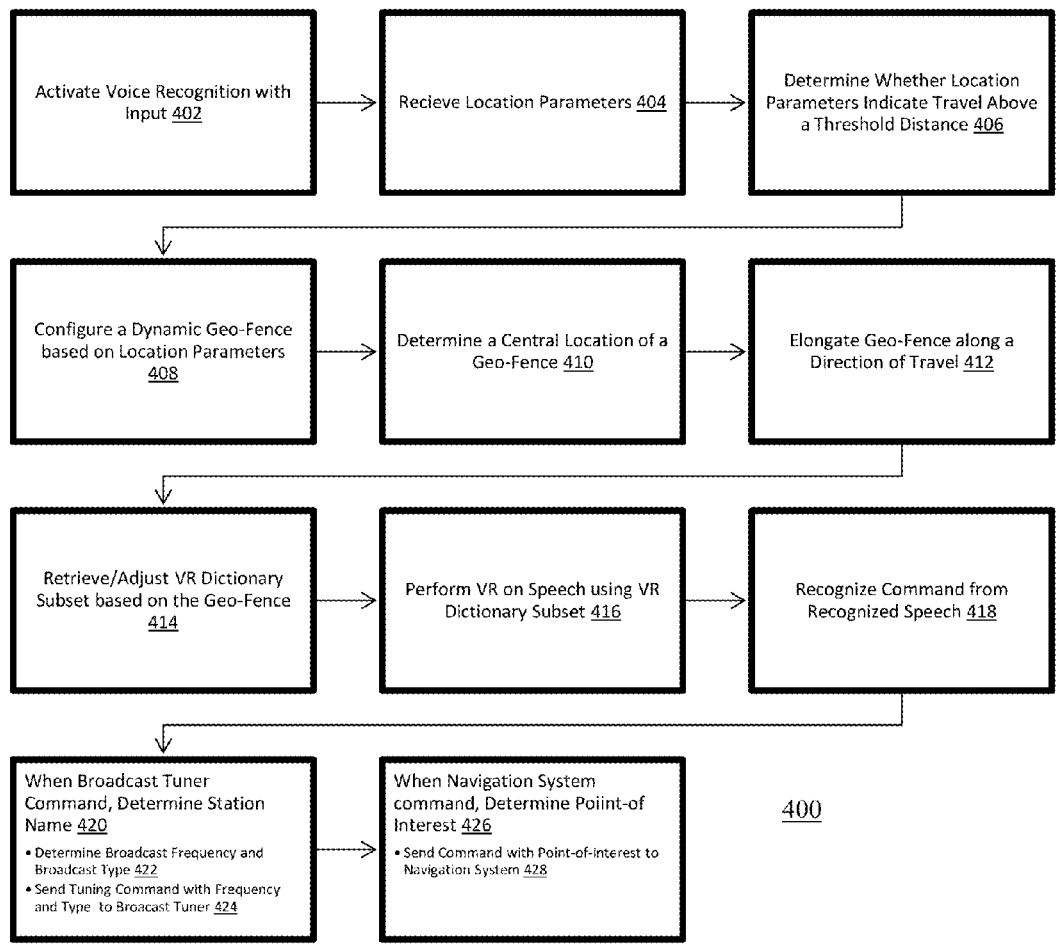
FIG. 4 illustrates a flowchart for a method for dynamic geo-fencing of a voice dictionary in accordance with one embodiment of the present application.

FIG. 4 illustrates a flowchart for a method for dynamic geo-fencing of a voice dictionary in accordance with one embodiment of the present application. In an exemplary embodiment, a method 400 for dynamic geo-fencing of a voice dictionary may be performed by the mobile electronic device 100.

The method 400 may include activating voice recognition with an input unit at operation 402. The input unit may include activating an operation device, such as, a switch. The input unit may include speaking a command using, for example, the audio user interface 106. In some embodiments, the audio user interface 106 may be activated by activating a switch. The voice recognizer 110 may receive the speech and initiate a voice recognition process. Exemplary spoken commands may include "Radio WJFK," "Tune to WJFK," "Play WJFK," "Play NPR," "Tune to Sports," "Tune to Fox," "Tune to ABC" or the like.

The method 500 may include receiving location parameters 122 for the mobile electronic device 100 at operation 504. The location parameters may include a geographical location, an attitude and a velocity of the electronic device 100.

In some embodiments, at operation 406, the method 500 may include determining whether the present or current location parameters indicate that the electronic device 100 has traveled above a threshold distance from the location at which the last or previous geo-fence was configured. As such, unnecessary configuring of a fence can be minimized, for example, when the location specific data to be retrieved in a voice recognition dictionary subset is unlikely to change as the electronic device 100 is generally in the location included in the current voice recognition dictionary subset. Exemplary threshold distances for operation 406 may include 5 miles, 10 miles, 25 miles, 50 miles, or the like. In some embodiments, the exemplary threshold distances for operating 406 may vary by the broadcast type or technology.

At operation 408, the method 400 may include configuring a dynamic geo-fence 302 based on the location parameters. The dynamic geo-fence 302 may surround the location 308 of the electronic device 100 (See FIG. 3A and FIG. 3B).

At operation 410, the method 400 may include determining the position 306 about which the geo-fence 302 is centered. In some embodiments, the position 306 about which the geo-fence 302 is centered may be co-located with the location 308 of the mobile electronic device 100. In some embodiments, the position 306 about which the geo-fence 302 is centered may be centered on a position 306 disposed along a direction of travel 304 of the mobile electronic device 100.

In some embodiments, at operation 412, the method 400 may include elongating the geo-fence 302 along a direction of travel of the mobile electronic device 100. The elongation may be based on the speed of travel. For non-highway speeds, for example, 25 MPH, 35 MPH or the like, the geo-fence may be elongated by an elongation multiplier (for example, 10 miles). When traveling at a highway speed like 60 MPH, the geo-fence may be elongated to be, for example, 3, 4, 5 or the like, times the elongation multiplier.

At operation 414, the method 400 may include retrieving or adjusting the voice recognition dictionary subset based on the dynamic geo-fence 302. The retrieving may retrieve the dictionary data associated with the dynamically generated geo-fence area to form the VR dictionary subset 222. In exemplary embodiments, the retrieving may extract the VR dictionary subset 222 into a database, a view in a database, a table or a view of a database storing the VR dictionary 220, a separate file or the like. In exemplary embodiments, the method 400 may switch to or select one of multiple VR dictionary subsets, where each subset includes dictionary data for a different geo-fence area. In exemplary embodiments, operation 416 adjusts the VR dictionary subset 222 by adding the dictionary data associated with the dynamically generated geo-fence area as necessary. In exemplary embodiments, operation 416 adjusts the VR dictionary subset 222 by removing the dictionary data not associated with the dynamically generated geo-fence area as necessary.

At operation 416, the method 400 may include performing voice recognition on speech using the VR dictionary subset 416. The voice recognition may convert the spoken inputs or speech into strings of alphanumeric characters. The alphanumeric characters may be provided in binary form or any other form that is suitable for processing. The alphanumeric characters may be indicative of the pronunciation of the spoken inputs as provided by the user. The strings of characters may be used by to create a list of preliminary candidate interpretations. The preliminary candidate interpretations on the list may be provided in an order based on decreasing similarity of pronunciation with the character string. The preliminary candidate interpretations on the list may be provided in an order listing matches from a VR dictionary subset 222 (see FIG. 2) followed by matches from a VR dictionary 220 (see FIG. 2).

At operation 418, the method 400 may include recognizing a command from the recognized speech. Method 400 receives from a user (e.g., a user of the electronic device 100) a spoken command. In exemplary embodiments, the spoken command may request tuning the radio to a station by name. In exemplary embodiments, the spoken command may request the navigation system to display a position of a point of interest, directions to the point of interest, and the like. The voice recognition of the spoken command (speech) may determine a spoken command. The voice recognition may perform voice recognition on any parameters included or accompanying the spoken command using the VR Dictionary subset 222. In exemplary embodiments, the spoken command and the parameters are one word, for example, the system may determine that the spoken command is a broadcast station name and request that the broadcast tuner tune to the frequency and band associated with the broadcast station name. In exemplary embodiments, voice recognition is performed on any parameters included or accompanying the spoken command using the VR Dictionary 220, for example, when voice recognition using the VR dictionary subset 222 fails. In exemplary embodiments, the voice recognition operation 418 receives input from a user via the input unit 204. In exemplary embodiments, the voice recognition operation 418 may provide feedback to the user using the output unit 206. In exemplary embodiments, the input unit 204 may include the audio user interface 106.

At operation 420, the method 400 may determine that a command, for example, per operation 418, is a command to tune to a broadcast station and determine a broadcast station name that is, for example, accompanies the command. In some embodiments, speech that speaks the broadcast station name may be the command that tunes a broadcast tuner to the broadcast station. The command may include a station name or identifier, such as, "WJFK." The command may include a station genre as a station name, such as, "Sports." The command may include a broadcast network as a station name, such as, "Fox," "ABC." In exemplary embodiments, when a station genre or broadcast network is specified, the method 400 may determine the associated broadcast station name, frequency or type for the station genre or broadcast network that broadcasts in the dynamic geo-fenced area.

At operation 422, after determining the broadcast station name per operation 420, the method 400 may determine a broadcast frequency and broadcast type. The broadcast frequency and broadcast type may be retrieved from the VR dictionary subset 222 or the VR dictionary 220.

At operation 424, the method 400 may request or send a broadcast tuning command to the broadcast tuner 104. The broadcast tuner 104 may set the tuned to frequency and type.

At operation 426, the method 400 may determine that a command, for example, per operation 418, is a command for the navigation unit 122 and determine that a parameter accompanies the command. The method 400 may retrieve a point-of-interest from the VR dictionary subset 222. In some embodiments, speech that accompanies the command may name a point-of-interest. Exemplary commands may include "Distance to Airport," "Navigate to Central Park," and the like.

At operation 428, the method 400 may request or send the navigation command with the accompanying parameters to the navigation unit 114 to implement the command.

The above-described embodiments according to the present disclosure may be implemented in the form of a program command that may be executed through various constituent elements of a computer, and the program command may be recorded on a computer-readable recording medium. The above-described computer-readable recording medium may independently include a program command, a data file, a data structure, or the like or may include a combination thereof. The program command recorded on the computer-readable recording medium is designed and configured especially for the present disclosure and may be known to those skilled in the art in the field of computer software to be usable. Examples of the computer-readable recording medium include a magnetic medium such as a hard disk, a floppy disk, or a magnetic tape, an optical recording medium such as a CD-ROM or a DVD, a magneto-optical medium such as a floptical disk, and a hardware device such as a ROM, a RAM, or a flash memory that is especially configured so as to store and execute the program command. Examples of the program command include not only a machine code that is produced by a compiler but also a high-level language code that may be executed by a computer using an interpreter or the like. The above-described hardware device may be configured to operate as one or more software modules used for performing the process according to the present disclosure, and the program command may be implemented as one or more hardware devices.

While the exemplary embodiments have been shown and described, it will be understood by those skilled in the art that various changes in form and details may be made thereto without departing from the spirit and scope of the present disclosure as defined by the appended claims.

In addition, many modifications may be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A computer-implemented method, comprising:
obtaining, by an electronic device from at least one global positioning system (GPS), location parameters comprising a location of the electronic device, a direction of travel of the electronic device and a speed of the electronic device;
configuring, by the electronic device, a dynamic geo-fenced area based on the location parameters, wherein the dynamic geo-fenced area surrounds the location of the electronic device;
retrieving, by the electronic device, a Voice Recognition (VR) dictionary subset comprising data associated with the dynamic geo-fenced area from a VR dictionary, wherein the data comprise a broadcast station name and a broadcast frequency associated with the broadcast station name; and
performing voice recognition using the VR dictionary subset.

2. The method of claim 1, further comprising:
determining, by the electronic device, that the speech comprises a desired broadcast station name;
determining the frequency associated with the desired broadcast station name; and
requesting, by the electronic device, that a broadcast tuner tune to the associated frequency.

3. The method of claim 1, wherein the dynamic geo-fenced area is off-centered from the location of the electronic device along the direction of travel of the electronic device.

4. The method of claim 1, further comprising:
receiving second location parameters;
determining that the second location parameters indicate travel of the electronic device above a threshold distance from the location;
retrieving, by the electronic device, a new VR dictionary subset pertaining to a new dynamic geo-fenced area surrounding the second location parameters; and
reconfiguring, by the electronic device, the new VR dictionary subset as the VR dictionary subset in use.

5. The method of claim 1, wherein an update frequency of retrieving the VR dictionary subset is based on the speed of travel of the electronic device.

6. The method of claim 1, wherein a size of the dynamic geo-fenced area is based on the speed of travel of the electronic device.

7. The method of claim 1, wherein the broadcast tuner is configured to tune to one or more of an AM radio broadcast, an FM radio broadcast, a satellite radio broadcast, a terrestrial television broadcast and a satellite television broadcast.

8. The method of claim 1, wherein the retrieving comprises adjusting the VR dictionary subset to comprise broadcast station names for the dynamic geo-fenced area.

9. The method of claim 1, further comprising:
receiving, by the electronic device, broadcast station names via a broadcast; and
adding the received broadcast station names into the VR dictionary.

10. The method of claim 1, wherein the VR dictionary subset further comprises names of points-of-interest in the dynamic geo-fenced area.

11. A mobile electronic device, comprising:
a broadcast tuner configured to receive tuning commands; and
a voice recognizer for communicating spoken commands to the broadcast tuner, wherein the voice recognizer is configured to
obtain, from at least one global positioning system (GPS), location parameters comprising a location of the electronic device, a direction of travel of the electronic device and a speed of the electronic device,
configure a dynamic geo-fenced area based on the location parameters, wherein the dynamic geo-fenced area surrounds the location,
retrieve a Voice Recognition (VR) dictionary subset comprising data associated with the dynamic geo-fenced area from a VR dictionary, wherein the data comprise a broadcast station name and a frequency associated with the broadcast station name, and
perform voice recognition using the VR dictionary subset.

12. The device of claim 11, where the voice recognizer is further configured to:
determine that the speech comprises a desired broadcast station name;
determine the frequency associated with the desired broadcast station name; and
request that the broadcast tuner tune to the associated frequency.

13. The device of claim 11, wherein the dynamic geo-fenced area is off-centered from the location of the electronic device along the direction of travel of the electronic device.

14. The device of claim 11, where the voice recognizer is further configured to:
receive second location parameters;
determine that the second location parameters indicate travel of the electronic device above a threshold distance from the location;
retrieve a new VR dictionary subset pertaining to a new dynamic geo-fenced area surrounding the second location parameters; and
reconfigure the new VR dictionary subset as the VR dictionary subset in use.

15. The device of claim 11, wherein an update frequency of retrieving the VR dictionary subset is based on the speed of travel of the electronic device.

16. The device of claim 11, wherein a size of the dynamic geo-fenced area is based on the speed of travel of the electronic device.

17. The device of claim 11, wherein the broadcast tuner is configured to tune to one or more of an AM radio broadcast, an FM radio broadcast, a satellite radio broadcast, a terrestrial television broadcast and a satellite television broadcast.

18. The device of claim 11, wherein the voice recognizer is further configured to adjust the VR dictionary subset to comprise broadcast station names for the dynamic geo-fenced area.

19. The device of claim 11, wherein the voice recognizer is further configured to receive broadcast station names via a broadcast and add the received broadcast station names into the VR dictionary.

20. The device of claim 11, wherein the VR dictionary subset further comprises names of points-of-interest in the dynamic geo-fenced area.

\* \* \* \* \*